Oct. 25, 1949.     H. W. ROCKWELL     2,486,372
DETACHABLE IMPLEMENT FOR VEHICLES
Filed Aug. 12, 1944     4 Sheets-Sheet 1
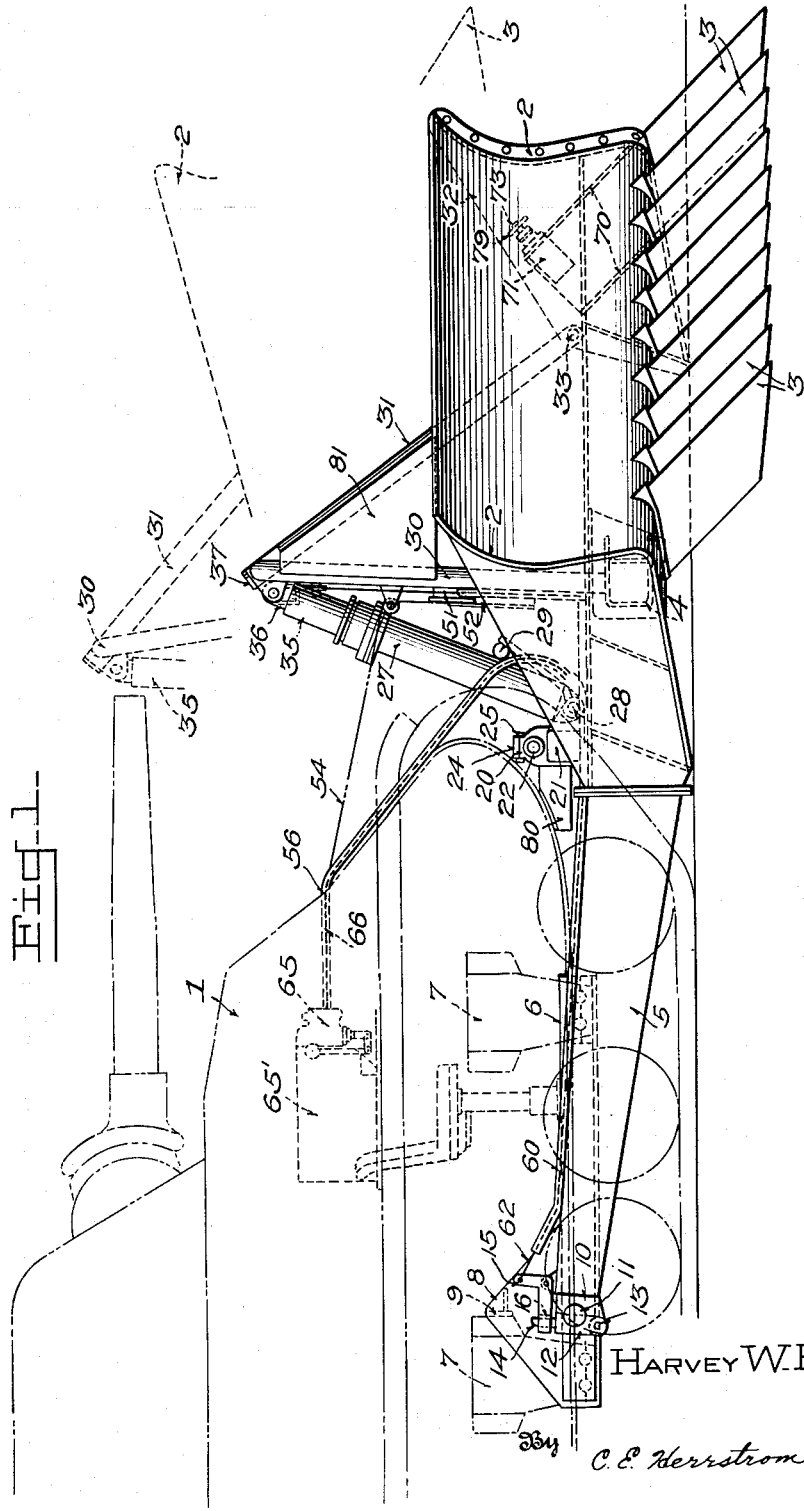

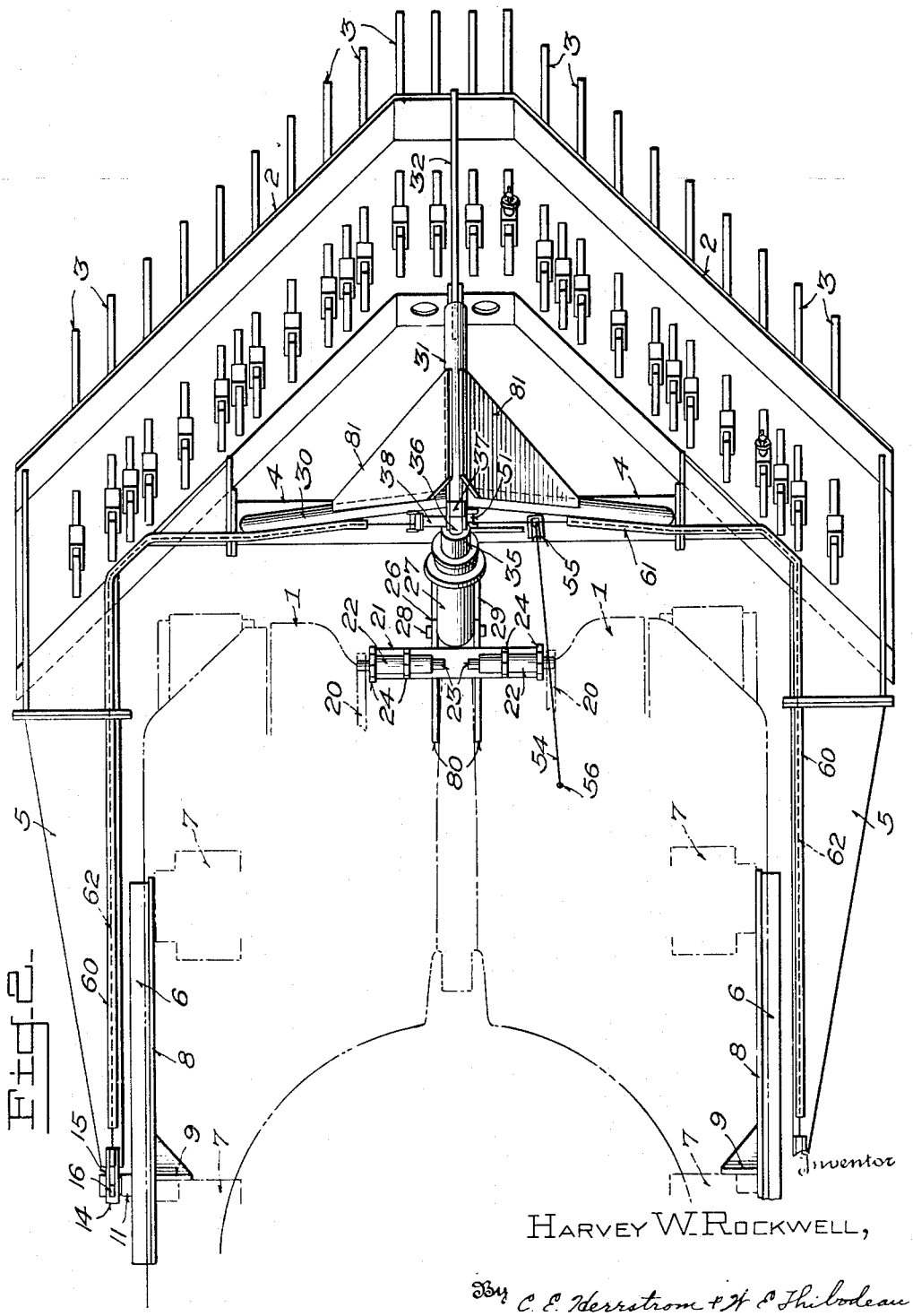

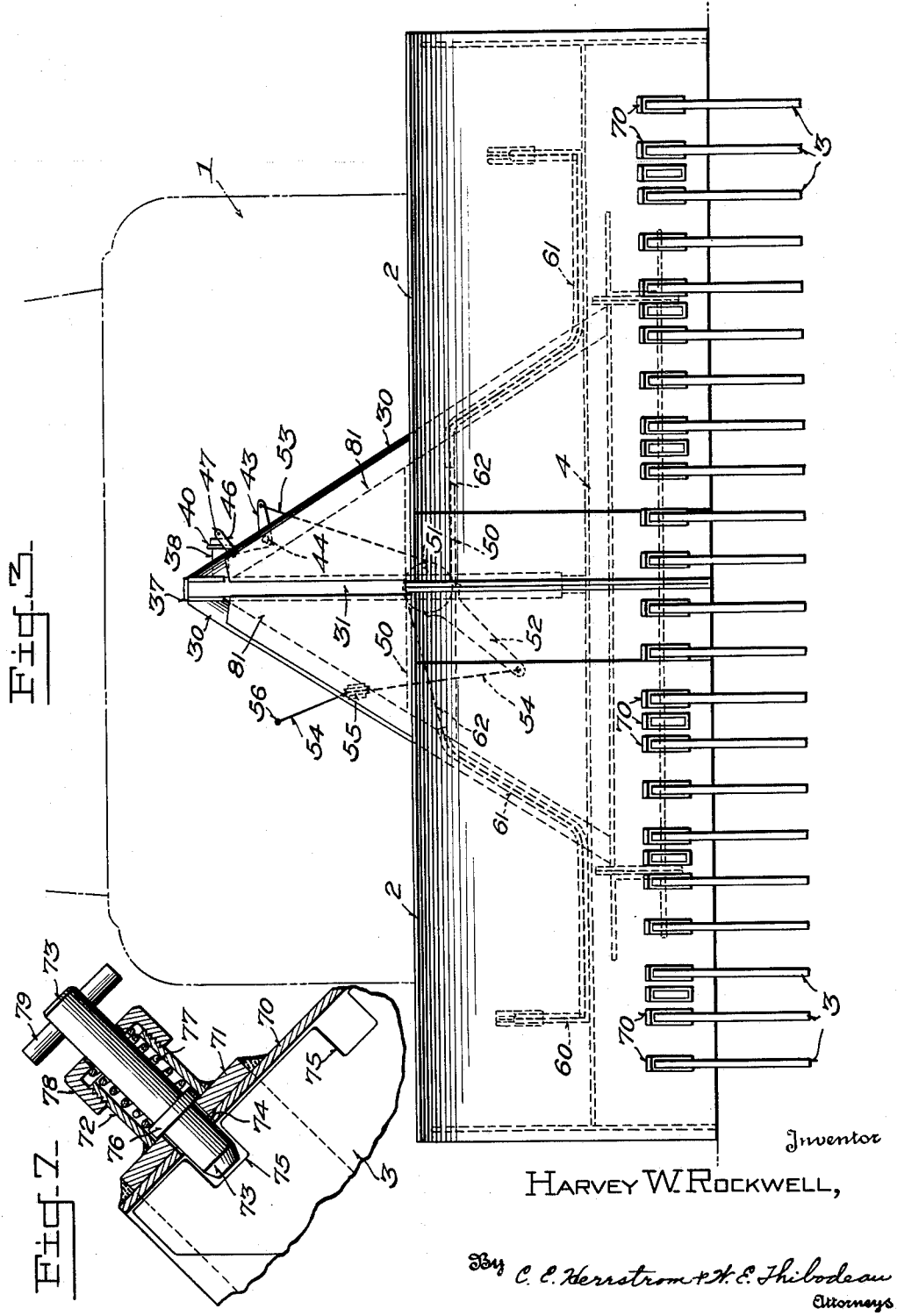

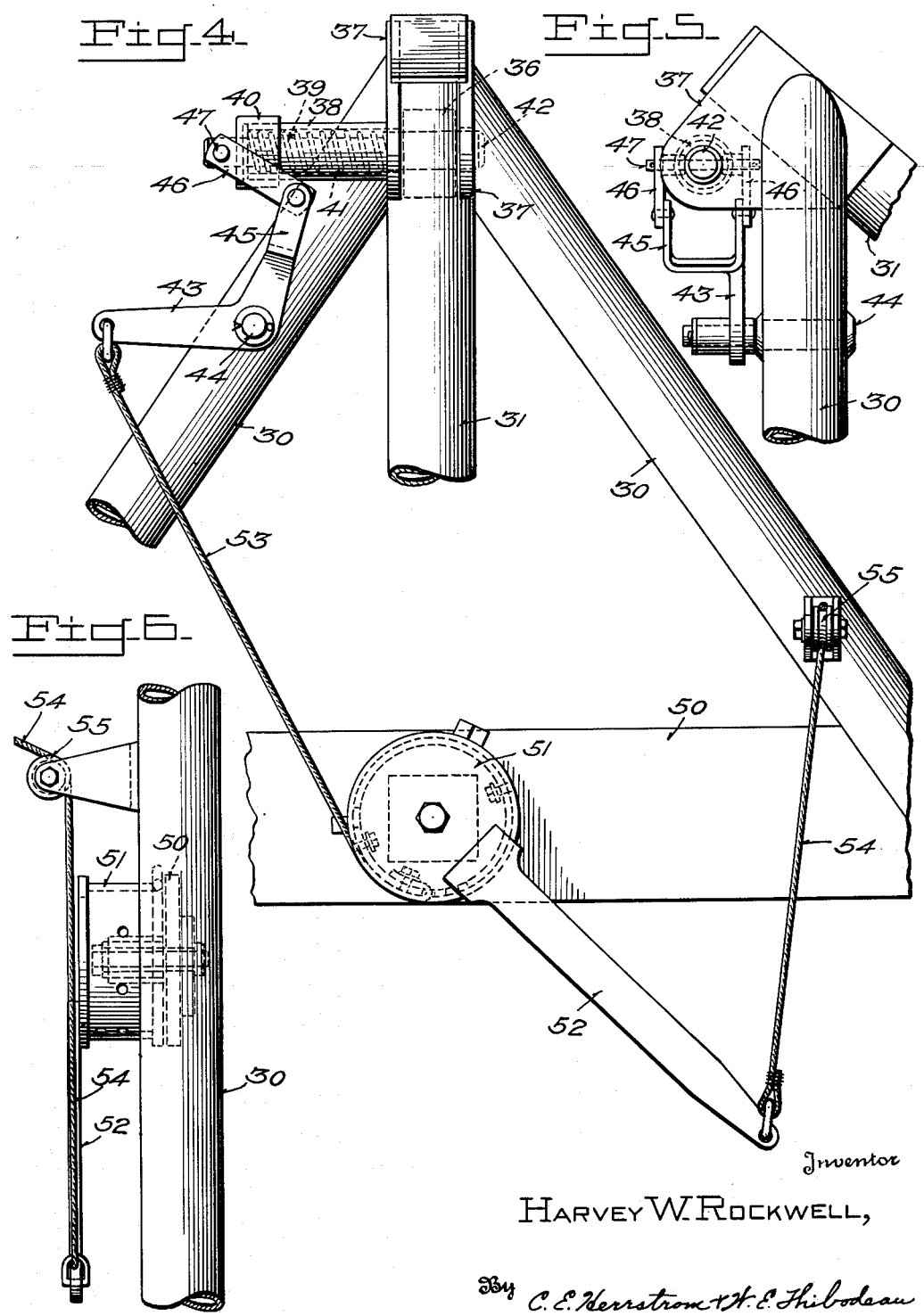

Patented Oct. 25, 1949

2,486,372

UNITED STATES PATENT OFFICE 2,486,372

DETACHABLE IMPLEMENT FOR VEHICLES

Harvey W. Rockwell, Cedar Rapids, Iowa

Application August 12, 1944, Serial No. 549,182

6 Claims. (Cl. 248—1)

The present invention pertains to a novel mechanism whereby an implement attached to a power-driven vehicle may readily be detached therefrom to permit the vehicle to back away from the implement.

The embodiment of the invention described herein is an earth-working implement, such as an excavator, propelled by a combat tank. This arrangement is used for clearing minefields on land. It is desirable in some cases to abandon the implement quickly and salvage the tank, as in instances when the implement is destroyed or the vehicle is attacked by surprise. The invention provides detachable connections between the implement and the vehicle, with a common operating means joined to all the connections and within convenient reach of the operator of the vehicle, who is thereby enabled by a single actuation of the operating means to release all the fastenings of the implement to the vehicle. The common control means is preferably in the form of a cable which is joined by individual cables to the several detachable connections.

The invention also provides a jack for adjusting the implement at various distances below the ground level and for a means of lifting it above the ground line to transporting position. This jack has one end attached to the vehicle and the other end to an upright mounted on the implement. The latter attachment is one of the aforementioned detachable connections and, when released, leaves the jack on the vehicle.

The invention, insofar as the system of detachable connections is concerned, is applicable to various forms of implements that may be carried or propelled by a power-driven vehicle.

An illustrative embodiment of the invention is disclosed in the following description and in the accompanying drawings in which:

Figure 1 is a side elevation of the forepart of a vehicle with an implement and its operating mechanism shown in an operative position in full lines and in inoperative position in dotted line outline;

Figure 2 is a top plan view of the device shown in Figure 1;

Figure 3 is a front elevation of the implement and operating mechanism;

Figure 4 is a detail in rear elevation of the latching mechanism for securing the jack to the tripod;

Figure 5 is a side elevation of a part of the detail shown in Figure 4;

Figure 6 is a plan view of the cable actuating mechanism shown in Figure 4;

Figure 7 is a detail, partially in section of the moldboard adjusting device for the teeth.

In Figure 1 is shown a powered vehicle such as a combat tank 1 to which the earth-working implement is applied. The implement in this case is a digger of the harrow type including a substantially V-shaped moldboard 2 carrying a series of teeth 3. Across the open side of the implement is a horizontal beam 4 which lies across the front of the vehicle in the operative position. To each end of the frame is secured a bar 5 extending along the corresponding side of the vehicle to approximately the midpoint thereof.

To each side of the vehicle is secured an attaching plate 6 fastened in any suitable manner to the suspension frames 7. The rear edge of each member 6 carries a vertical web 8 formed with bracing flanges 9 suitably attached to the adjacent suspension frame 7. The rear end of each bar 5 is formed as a half bearing 10 receiving a stud 11 projecting laterally outward from the adjacent plate 6. The other half 12 of the bearing is pivotally attached at 13 to the bar 5 and is disposed on the rear side of the stud 11. A finger 14 extends upward from the member 12, and on the adjacent end of the rail 5 is pivotally mounted a bell crank lever 15 having a substantially horizontal arm formed with a slot 16 normally receiving the finger 14 and holding the member 12 from swinging rearward.

At the forward end of the vehicle is provided a pair of towing eyes 20 between which is inserted a bar 21. The latter is formed with a pair of bosses 22 at each end of the bar alined with the eyes. Each pair of bosses receives a slidable rod 23 adapted to be inserted in the adjacent eye. At intervals along the bosses there are provided split clamps 24 engaging the rod 23 and adapted to be secured thereto by bolts 25 passed through the elements of each clamp. A yoke 26 extends forwardly from the bar 21 and has the lower end of a cylinder 27 pivotally mounted therein at 28. The yoke is extended upwardly at 29 beneath the cylinder to serve as a stop defining the lowermost position of the cylinder.

Mounted upon the implement is a tripod comprising two lateral legs 30 attached to the beam 4 and a forward leg 31 secured to a vertical web 32 in the moldboard 2 by the bolt 33.

A piston 35 extends from the upper end of the cylinder 27 and is formed on its upper extremity with a flat tongue 36. A clevis 37 is secured on the apex of the tripod and receives the tongue. To one side of the clevis is fastened a laterally extending tube 38 in which is slidably mounted a pin 39. A cap 40 is applied to the outer end of the tube and is penetrated by the pin as shown in Figure 4. A coil spring 41 surrounds the pin and has one end bearing against the cap and the other end bearing against the enlarged portion 42 of the pin. This portion passes through the clevis and the tongue 36 to form the pivotal connection between the piston 35 and the tripod.

A bell crank lever 43 is pivotally mounted at 44 on one of the lateral legs 30 of the tripod. One side of the lever is formed as a yoke 45 which is attached to a pair of links 46 pivotally mounted on a cross pin 47 passed through the pin 39 externally of the cap 40.

A horizontal brace 50 fixed across the legs 30 of the tripod rotatably supports a drum 51 on a horizontal axis. An operating lever 52 extends from the drum. A cable 53 wound on the drum is connected to the free end of the bell crank lever 43. Thus, when the lever 52 is turned to wind the cable on the drum, the pin 39 will be withdrawn from the tongue 36 to separate the hydraulic jack from the tripod. The lever 52 is actuated by a cable 54 extending therefrom over a pulley 55 on one of the legs 30 and into the vehicle at 56 within reach of the driver.

On each of the bars 5 is mounted a tube 60 extending substantially the entire length thereof and suitably bent at 61 from its forward end towards the drum 51. To the non-engaging end of each bell crank lever 15 is attached a cable 62 passing through the corresponding tube 60, 61 and wound on the drum 51. Thus, when the operator rotates the drum by pulling the control cable 54, the bell cranks 15 will disengage the fingers 14 and the vehicle can be backed away from the implement. The cable 54 may be released from the vehicle and retained with the implement when the latter is detached.

65 is a directional control valve mounted on a fluid reservoir 65'. This valve receives a flow of fluid from a pump (not shown) which is mounted on a bracket on the vehicle transmission case and is driven by "V" belts from the propeller shaft drive flange, and furnishes pressure fluid to the cylinder 27 through a conduit 66. By means of the hydraulic jack the elevation of the implement is adjusted for the desired penetration of the teeth 3 into the ground.

Each tooth 3 has its upper end inserted in a sleeve or envelope 70 carried by the moldboard 2. Over the forward sloping wall of each envelope is fitted and secured a U-shaped strap 71 on the back of which is secured a cylinder 72. Each cylinder contains a pin 73 passing through a hole 74 in the back of the member 70 and adapted to enter a selected notch 75 of a series of notches formed in the forward sloping edge of the corresponding tooth. The effective length of each tooth, or its extension from the moldboard, is determined by the notch into which the pin is inserted.

A shoulder 76 formed on the pin disposed within the cylinder seats around the edge of the hole 74 to limit the inward movement of the pin. This shoulder is engaged by a coil spring 77 surrounding the pin, the other end of the spring bearing against the cap 78 screwed on the outer end of the cylinder 72. The pin passes through the cap and is provided externally with a pull handle 79 for manually releasing the pin from the tooth in order to permit adjustment of the latter. The effective length of the teeth is decreased for harder ground. Successive layers of earth are broken by lowering the implement at the hydraulic jack.

Shoes 80 are extended rearwardly from the bar 21 to engage beneath the hull of the vehicle. These members prevent the bar 21 from tilting about the towing eyes 20 when the implement is elevated off the ground. The forward surfaces of the pyramid formed by the tripod are preferably covered above the moldboard 2 by triangular plates 81 extending from the leg 31 to each leg 30. These plates protect the upper portion of the jack from light ammunition.

Although the invention has been described in connection with a digger of the harrow type, it is also applicable to other forms of earth-working implements such as, for example, a scraper or bulldozer.

While a specific embodiment of the invention has been shown and been described, it will be understood that various alterations may be made without departure from the spirit of the invention as indicated by the appended claims.

What I claim is:

1. In a propelled earth-working implement having vehicle connecting structure thereon for attachment of said implement to a propelling power-driven vehicle across one end of the latter, said connecting structure including a pair of arms extending rearwardly from said implement and pivotally mountable one on each side of said vehicle, each of said arms being pivotally mountable adjacent its free end to a stud extending laterally from the respective side of said vehicle, and an upright on said implement pivotally connectable at its free end to the free end of a jack mounted on said vehicle, the combination with said connecting structure of quick detachable connecting mechanism comprising a half-bearing on the free end of each of said bars, a complementary half-bearing pivotally mounted on each of said bars and forming with the respective first mentioned half-bearing a complete bearing engageable with the corresponding said stud, a finger extending from each said complementary half-bearing, a hook member pivotally mounted on each of said bars and removably engageable with the corresponding said finger to retain said complementary half-bearing in engagement with said stud, a withdrawably removable connecting pivot pin slidable mountedly in said free end of said upright and said free end of said jack, a cable drawing device actuatable to simultaneously draw a plurality of cables drawably connected thereto, cables extending from said hooks and said pin and drawably connected to said device, and means for actuating said device, whereby to simultaneously remove said hooks from said fingers and withdraw said pin.

2. In a propelled earth-working implement, the combination with the connecting structure of the quick detachable connecting mechanism as set forth in claim 1, wherein said cable drawing device is a drum rotatable by said actuating means.

3. In a propelled earth-working implement, the combination with the connecting structure of the quick detachable connecting mechanism as set forth in claim 2, wherein said actuating means comprises a lever attached to said drum, said lever being operable from within said vehicle on attachment to the latter of said implement.

4. In a mine exploder having vehicle connecting structure thereon for attachment of said exploder to a propelling power-driven vehicle, said connecting structure including a pair of arms extending rearwardly from said exploder and pivotally mountable one on each side of said vehicle, each of said arms being pivotally mountable adjacent its free end to a stud extending laterally from the respective side of said vehicle, and an upright on said exploder pivotally connectable at its free end to the free end of a jack mounted on said vehicle, the combination with said connecting structure of quick detachable connecting mechanism comprising a half-bearing on the free end of each of said bars, a complementary half-bearing pivotally mounted on each of said bars and forming with the respective first mentioned half-bearing a complete bearing engageable with the corresponding said stud, a finger extending from each said complementary half-bearing, a retaining member pivotally mounted on each of said bars and having an arm removably engageable with the corresponding said finger to retain said complementary half-bearing in engagement with said stud, a withdrawably removable connecting pivot pin slidable mountedly in said free end of said upright and said free end of said jack, a cable drawing device actuatable to simultaneously draw a plurality of cables drawably connected thereto, cables extending from said retaining members and said pin and drawably connected to said device, and means for actuating said device, whereby to simultaneously remove said arms of said retaining members from said fingers and withdraw said pin.

5. In a mine exploder, the combination with the connecting structure of the quick detachable connecting mechanism as set forth in claim 4, wherein said cable drawing device is a drum rotatable by said actuating means.

6. In a mine exploder, the combination with the connecting structure of the quick detachable connecting mechanism as set forth in claim 5, wherein said actuating means comprises a lever attached to said drum, said lever being operable from within said vehicle on attachment to the latter of said exploder.

HARVEY W. ROCKWELL.

REFERENCES CITED

The following references are of record in the file of this patent:

UNITED STATES PATENTS

| Number | Name | Date |
| --- | --- | --- |
| 635,931 | Harrison | Oct. 31, 1899 |
| 1,211,342 | Pena | Jan. 2, 1917 |
| 1,393,972 | Ronning | Oct. 18, 1921 |
| 1,588,942 | Clark | June 15, 1926 |
| 2,200,320 | Hojnowski | May 7, 1940 |
| 2,231,875 | Behnke et al. | Feb. 18, 1941 |
| 2,333,237 | Andersen et al. | Feb. 25, 1941 |
| 2,332,155 | Lobelle et al. | Oct. 19, 1943 |
| 2,332,561 | Drott | Oct. 26, 1943 |
| 2,341,151 | Maloon | Feb. 8, 1944 |
| 2,361,362 | Altgelt | Oct. 31, 1944 |
| 2,376,336 | Brown | May 22, 1945 |